US009856999B2

(12) United States Patent
Baek

(10) Patent No.: US 9,856,999 B2
(45) Date of Patent: Jan. 2, 2018

(54) CORRUGATED STEEL PIPE AND METHOD FOR MANUFACTURING THE SAME

(71) Applicant: Yong Seok Baek, Incheon (KR)

(72) Inventor: Yong Seok Baek, Incheon (KR)

( * ) Notice: Subject to any disclaimer, the term of this patent is extended or adjusted under 35 U.S.C. 154(b) by 187 days.

(21) Appl. No.: 14/771,196

(22) PCT Filed: Dec. 12, 2013

(86) PCT No.: PCT/KR2013/011522
§ 371 (c)(1),
(2) Date: Aug. 27, 2015

(87) PCT Pub. No.: WO2014/147724
PCT Pub. Date: Sep. 25, 2014

(65) Prior Publication Data
US 2016/0003379 A1   Jan. 7, 2016

(30) Foreign Application Priority Data

Mar. 18, 2013  (KR) .................. 10-2013-0028442

(51) Int. Cl.
| F16L 9/06 | (2006.01) |
| F16L 9/17 | (2006.01) |
| B21D 5/10 | (2006.01) |
| B21D 15/06 | (2006.01) |

(52) U.S. Cl.
CPC .............. F16L 9/06 (2013.01); B21D 5/10 (2013.01); F16L 9/17 (2013.01); B21D 15/06 (2013.01)

(58) Field of Classification Search
CPC ..... F16L 9/06; F16L 9/17; B21D 5/10; B21D 15/06

USPC ........ 138/151, 156, 173, 157, 162, 163, 155
See application file for complete search history.

(56) References Cited

U.S. PATENT DOCUMENTS

| 4,261,671 A * | 4/1981 | Langner ............... F16L 1/203 |
| | | 138/148 |
| 7,992,904 B2 * | 8/2011 | Bloom ............... F16L 21/08 |
| | | 138/164 |

FOREIGN PATENT DOCUMENTS

| JP | 2647624 B2 | 8/1997 |
| JP | 09-234511 A | 9/1997 |
| JP | 3516914 B2 | 4/2004 |
| KR | 10-2003-0082506 A | 10/2003 |

* cited by examiner

*Primary Examiner* — Craig Schneider
*Assistant Examiner* — David Deal
(74) *Attorney, Agent, or Firm* — Patent Office of Dr. Chung Park

(57) ABSTRACT

A corrugated steel pipe is disclosed. The corrugated steel pipe comprises a plurality of unit steel pipes, which are continuous in the axial direction. Each unit steel pipe comprises a first cylindrical pipe obtained by bending a first unit steel plate into a cylindrical shape, both ends of the first unit steel plate abutting each other and forming a first seam on one side of the first cylindrical pipe; and a second cylindrical pipe obtained by bending a second unit steel plate into a cylindrical shape, both ends of the second unit steel plate abutting each other and forming a second seam on one side of the second cylindrical pipe. The second cylindrical pipe is bent into a cylindrical shape and folded on the outer surface of the first cylindrical pipe so that the inner surface of the second unit steel pipe surrounds the first seam. The second seam is positioned not to correspond to the first seam.

2 Claims, 12 Drawing Sheets

CORRUGATED STEEL PIPE AND METHOD FOR MANUFACTURING THE SAME

CROSS-REFERENCE TO PRIOR APPLICATIONS

This application is a national Stage Patent Application of PCT International Patent Application No. PCT/KR2013/011522, filed on Dec. 12, 2013 under 35 U.S.C. §371, which claims priority of Korean Patent Application No. 10-2013-0028442, filed on Mar. 18, 2013, which is all hereby incorporated by reference in its entirety.

BACKGROUND OF THE INVENTION

Field of the Invention

The present invention relates to a corrugated steel pipe, and more particularly, to a corrugated steel pipe in which a fluid smoothly flows, the corrugated steel pipe is not easily ruptured by pressure which increases therein, and the corrugated steel pipe is rapidly manufactured, a manufacturing period and manufacturing cost are reduced.

Discussion of the Related Art

Concrete pipes are primarily used to guide movement of a fluid on roads, harbors, sewage treatment plants, and the like. When the concrete pipes are transported and handled, heavy equipment is required to be input due to an increase in weight and volume of a vehicle body and a construction period is lengthened due to an increase in connector together with a decrease in workability caused by installation and uninstallation of a mold during construction, and the concrete pipes have seasonal restrictions due to freezing of base cement linking connectors.

Further, the concrete pipes are excellent in strength, but weak to impact applied from the outside, and as a result, the concrete pipes are easily cracked or in severe cases, the concrete pipes are damaged.

Accordingly, in recent years, a steel pipe is used, in which a galvanized steel plate is rolled in a spiral shape and a rolled boundary is lock-seam connected and the quantity of the steel pipes has been gradually increased.

The steel pipe has a simple shape in which the steel pipe is rolled in the spiral shape and the boundary is lock-seam connected and all residual parts other than the lock-seam connection portion is smooth. The steel pipe significantly solves the problem of the concrete pipe, but since an inner diameter part of all residual parts other than the lock-seam connection portion is not curved and flat, the strength significantly deteriorates, and as a result, the steel pipe cannot be widely used for a purpose of guiding transfer of a fluid such as water supply and sewage systems.

In order to solve the problem of the steel pipe, a corrugated steel pipe having a spiral in the longitudinal direction on the circumference of the pipe is manufactured and released. The corrugated steel pipe may have a shape in which inlets having a substantially soft wave shape are consecutively integrated so that a diameter part is opened or a shape in which substantially ㄴ-shaped inlets are spaced apart from each other at a significant interval so that the diameter part is opened.

However, the corrugated steel pipe has an advantage in that the corrugated steel pipe is appropriately used, in particular, as a pipe that guides flows of the water supply and sewage systems because the strength is very large due to corrugations formed in a pipe body during use, but several problems due to the corrugations in the steel pipe.

That is, when the fluid flows along the inner diameter of the pipe body, the consecutively formed corrugations severely interfere in the fluid, and as a result, the flow of the fluid is not smooth and in this case, as pressure applied to the inner diameter part of the pipe body rises more than necessary, the fluid leaks through a ruptured portion while the lock-seam connection portion is ruptured and sediment is stacked at the integrated inlets due to the corrugations, and as a result, the fluid is contaminated due to decay of the sediment in long period usage.

Another problem of the corrugated steel pipe in the related art is that since the wave corrugations are consecutively formed in the spiral shape on the circumference of the steel pipe, it is very difficult to bind steel pipes cut with a predetermined length. That is, a flange needs to be fixed to the circumference of corresponding ends so as to bind both ends of the steel pipe and since spiral corrugations are consecutively formed from one end to the other end on the circumference of the waveform steel pipe in the related art, a general type flange cannot be coupled to the outer peripheries of both ends of the steel pipe.

Accordingly, in order to bind the waveform steel pipe in the related art, a special flange considering the spiral corrugations that protrude on the outer periphery of the stele pipe is separately manufactured and thereafter, the corresponding ends of the steel pie need to be bound by using the specially manufactured flange, and as a result, the number of manufacturing processes increase and manufacturing cost increases.

In order to solve the problems of the corrugated steel pipe in the related art, the present inventor has filed Korean Patent Application No. 10-2011-0061698, "Waveform Steel Pipe and the Process of manufacture". In the present patent, the fluid can smoothly flow in the steel pipe, reinforcing the steel pipe is convenient, and the corresponding ends of the steel pipes can be bound by using a reinforcing ring, but since the reinforcing ring cannot be fixed to the lock-seam portion, an installation section of the reinforcing is limitative, and as a result, it is difficult to bind the corresponding ends of the steel pipes by using the reinforcing ring and it is a little difficult to effectively increase the strength of the steel pipe only by the reinforcing ring.

Therefore, the present inventor has introduced the following technology in order to solve all problems of the waveform pipes in the related art.

SUMMARY OF THE INVENTION

An object of the present invention is to provide a corrugated steel pipe and a method for manufacturing the same which the strength increases, the flow of a fluid is smooth, the corrugated steel pipe is not easily ruptured by pressure which increases in a steel pipe, and a manufacturing period and manufacturing cost can be reduced.

In accordance with an embodiment of the present invention, in corrugated steel pipe including a plurality of unit steel pipes which are continuous in the axial direction, the unit steel pipe may include a first cylindrical pipe obtained by bending a first unit steel plate in a cylindrical shape and having a first seam at which both axial ends of the first unit steel plate abut each other on one side of the first cylindrical pipe, and a second cylindrical pipe obtained by bending a second unit steel plate in the cylindrical shape and having a second seam at which both axial ends of the second unit steel plate abut each other on one side of the second cylindrical pipe, the second cylindrical pipe may be bent into the cylindrical shape and folded on the outer surface of the first cylindrical pipe so that the inner surface of the second unit steel plate 20 surrounds the second seam, and the second seam may be positioned not to correspond to the first seam.

The first cylindrical pipe may include a stepped part on one side, the stepped part may be stepped from the outer surface of the first cylindrical pipe and be formed to have a larger diameter than the outer surface of the first cylindrical pipe, an opposite side of the stepped part may be inserted into the stepped part, and when the multiple unit steel pipes are continuous in the axial direction, the opposite side of the stepped part of the first cylindrical pipe may be inserted into the stepped part to couple the plurality of unit steel pipes to each other.

The second cylindrical pipe may include a plurality of hollows that are arranged at a predetermined interval in the circumferential direction of the second cylindrical pipe and protrude vertically in the circumferential direction.

In accordance with another embodiment of the present invention, a method for manufacturing a corrugated steel pipe may include: a) preparing a flat long first steel plate in a roll shape; b) preparing a flat long second steel plate in the roll shape; c) preparing multiple first unit steel plates by cutting the first steel plate prepared in the roll shape while unrolling the first steel plate; d) forming a stepped part on one side of the first unit steel plate by cutting one side of the first unit steel plate vertically to a plane of the first unit steel plate; e) forming a plurality of hollows by cutting both sides of the second steel plate with a predetermined pattern while unrolling the second steel plate which is prepared in the roll shape; f) preparing the multiple second unit steel plates by cutting the second steel plate with the hollows with a predetermined length; g) providing the second unit steel plates below the first unit steel plates while rolling the first unit steel plates to some degree; h) seam-welding the second unit steel plates to the first unit steel plates; i) completing a unit steel pipe in which a first cylindrical pipe formed by the first unit steel plate and a second cylindrical pipe formed by the second unit steel plate are folded on each other by welding both ends of the second unit steel plate which abut each other through completely rolling the first unit steel plate in the cylindrical shape and thereafter, completely rolling the second unit steel plate in the cylindrical shape; j) moving the completed unit steel pipe forward and thereafter, providing an additional first unit steel plate below the unit steel plate so that the stepped part of the first unit steel plate comes close contact to the outer surface of the first cylindrical pipe of the unit steel plate; and k) completing the additional unit steel pipe through steps a) to i) and thereafter, connecting the plurality of unit steel pipes to each other by repeating steps j) to i).

The corrugated steel pipe may further include a plurality of grooves that are arranged at a predetermined interval in the circumferential direction of the stepped part on the inner surface of the stepped part and the grooves may extend in the axial direction of the second cylindrical pipe, and an adhesive filler may be injected into the groove.

In accordance with yet another embodiment of the present invention, a method for manufacturing a corrugated steel pipe may include: a) preparing a flat long first steel plate in a roll shape; b) preparing a flat long second steel plate in the roll shape; c) preparing multiple first unit steel plates by cutting the first steel plate prepared in the roll shape while unrolling the first steel plate; d) forming a stepped part on one side of the first unit steel plate by cutting one side of the first unit steel plate vertically to a plane of the first unit steel plate; e) forming multiple grooves that extend in the longitudinal direction of the first unit steel plate on the inner surface; f) forming a plurality of hollows by cutting both sides of the second steel plate with a predetermined pattern while unrolling the second steel plate which is prepared in the roll shape; g) preparing the multiple second unit steel plates by cutting the second steel plate with the hollows with a predetermined length; h) providing the second unit steel plates below the first unit steel plates while rolling the first unit steel plates to some degree; i) seam-welding the second unit steel plates to the first unit steel plates; j) completing a unit steel pipe in which a first cylindrical pipe formed by the first unit steel plate and a second cylindrical pipe formed by the second unit steel plate are folded on each other by welding both ends of the second unit steel plate which abut each other through completely rolling the first unit steel plate in the cylindrical shape and thereafter, completely rolling the second unit steel plate in the cylindrical shape; k) moving the completed unit steel pipe forward and thereafter, providing an additional first unit steel plate below the unit steel plate so that the stepped part of the first unit steel plate comes close contact to the outer surface of the first cylindrical pipe of the unit steel plate; l) completing the additional unit steel pipe through steps a) to i) and thereafter, connecting the plurality of unit steel pipes to each other by repeating steps j) to i); and m) fixing the plurality of unit steel pipes connected to each other by filling an adhesive filler into the groove and curing the filled adhesive filler.

According to the exemplary embodiments of the present invention, in the corrugated steel pipe, a fluid smoothly flows, the corrugated steel pipe is not easily ruptured by pressure which increases in the corrugated pipe, and the corrugated steel pipe is rapidly manufactured, and as a result, a manufacturing period and manufacturing cost can be reduced.

Further, unit steel pipes can be simply fixed without a welding operation for fixing unit steel pipes which are connected to each other.

DETAILED DESCRIPTION OF THE EMBODIMENTS

Figure 1:
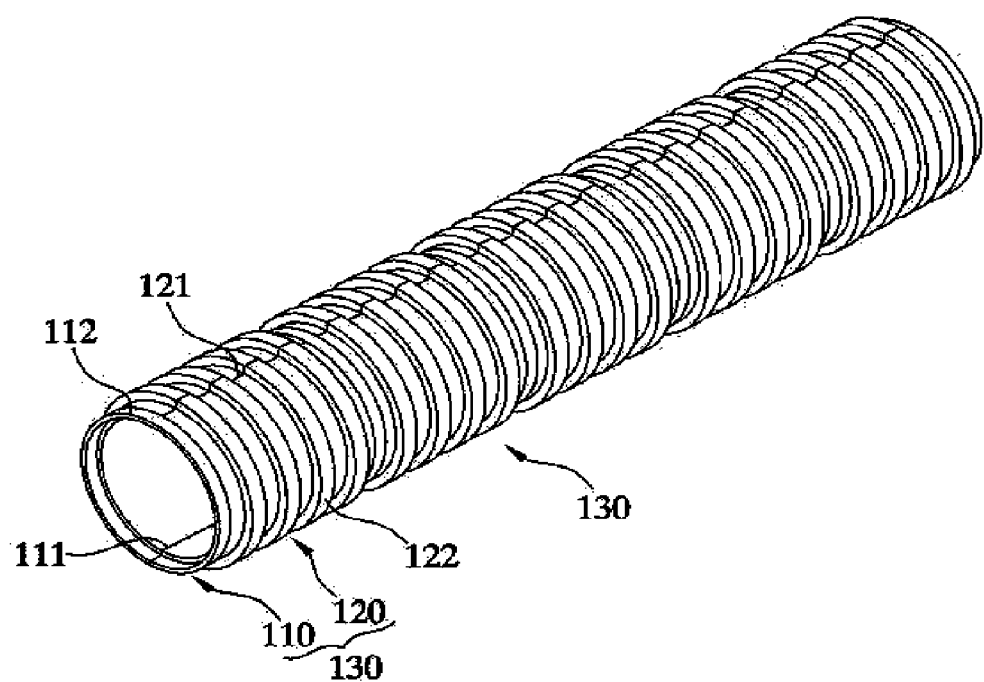
FIG. 1 is a perspective view for describing a corrugated steel pipe according to a first exemplary embodiment of the present invention.

Hereinafter, a corrugated steel pipe and a method for manufacturing the same according to exemplary embodiment of the present invention will be described in detail with reference to the accompanying drawings. The present invention may have various modifications and various embodiments and specific exemplary embodiments will be illustrated in the drawings and described in detail in the specification. However, this does not limit the present invention within specific disclosed embodiments, and it should be understood that the present invention covers all the modifications, equivalents and replacements within the idea and technical scope of the present invention. In describing each drawing, like reference numerals refer to like elements. In the accompanying drawings, the sizes of structures are enlarged compared with the actual sizes of the structures for clearness of the present invention.

Terms such as first or second may be used to describe various components but the components are not limited by the above terminologies. The above terminologies are used only to discriminate one component from the other component. For example, without departing from the scope of the present invention, a first component may be referred to as a second component, and similarly, a second component may be referred to as a first component.

Terms used in the present application are used only to describe specific exemplary embodiments, and are not intended to limit the present invention. Singular expressions used herein include plurals expressions unless they have definitely opposite meanings in the context. In the present application, it should be understood that term "include" indicates that a feature, a number, a step, an operation, a component, a part or the combination thereof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art, and are not interpreted as an ideally or excessively formal meaning unless clearly defined in the present invention.

First Exemplary Embodiment

Figure 2:
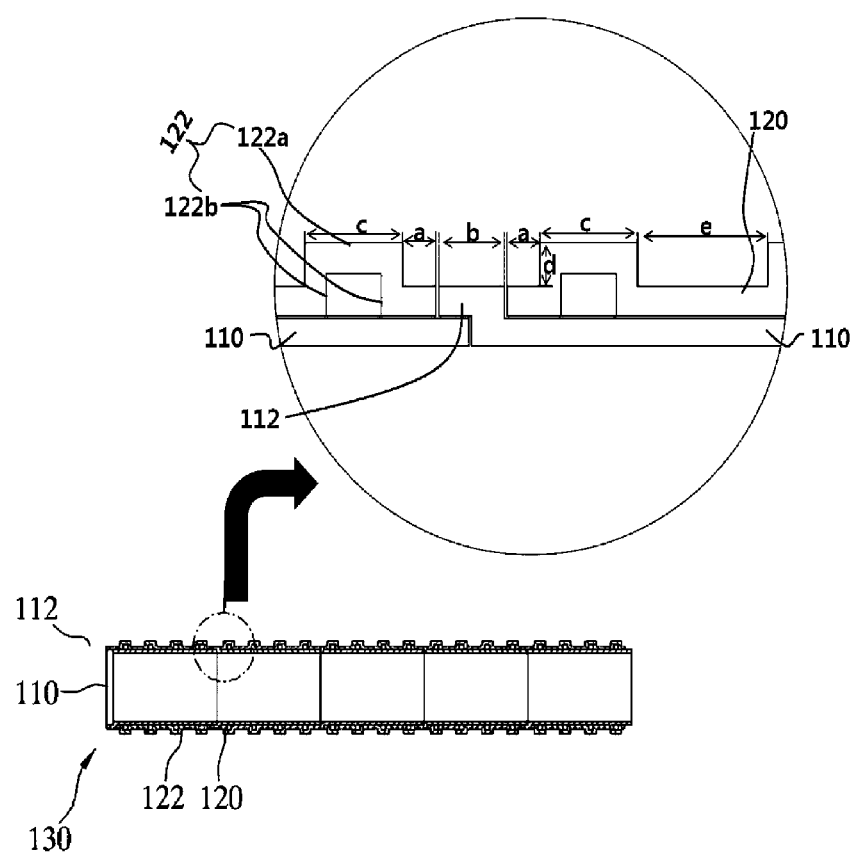
FIG. 2 is a perspective view illustrating unit steel pipes illustrated in FIG. 1.
Figure 3:
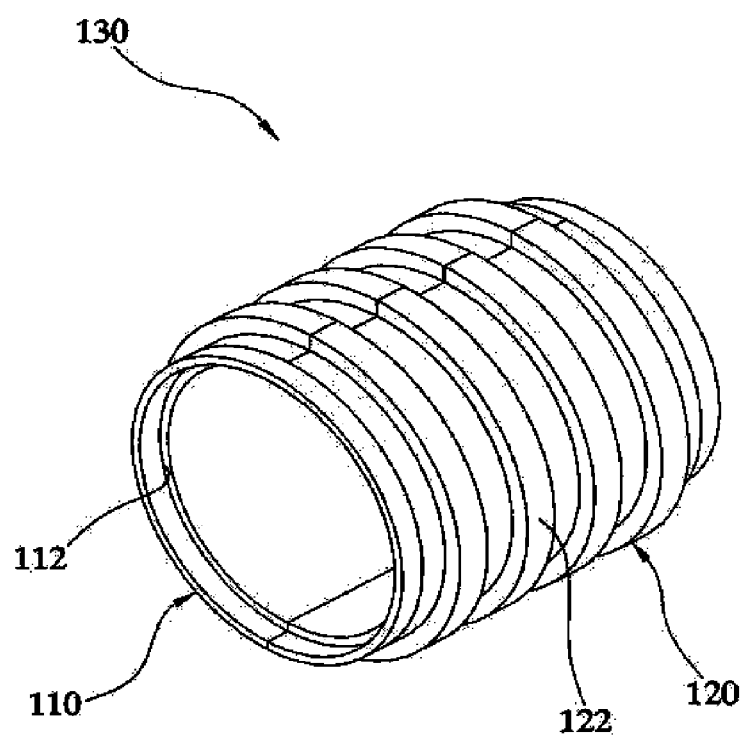
FIG. 3 is a cross-sectional view illustrating a cross-section of the corrugated steel pipe illustrated in FIG. 1.

FIG. 1 is a perspective view for describing a corrugated steel pipe according to a first exemplary embodiment of the present invention. FIG. 2 is a perspective view illustrating unit steel pipes illustrated in FIG. 1. FIG. 3 is a cross-sectional view illustrating a cross-section of the corrugated steel pipe illustrated in FIG. 1.

Referring to FIGS. 1 to 3, the corrugated steel pipe 100 according to the first exemplary embodiment of the present invention includes a plurality of unit steel pipes 130 which are continuous in the axial direction and each unit steel pipe 130 includes a first cylindrical pipe 110 and a second cylindrical pipe 120.

The first cylindrical pipe 110 is completed by bending the first unit steel pipe 10 in a cylindrical shape and has a first seam 111 at which both axial ends of the first unit steel pipe 10 abut each other on one side of the first cylindrical pipe 110. The first cylindrical pipe 110 is positioned inside the unit steel pipe 130.

The second cylindrical pipe 120 is completed by bending the second unit steel pipe 20 in the cylindrical shape and has a second seam 121 at which both axial ends of the second unit steel pipe 20 abut each other on one side of the second cylindrical pip 120.

The second cylindrical pipe 120 which is positioned outside the unit steel pipe 130 is bent into the cylindrical shape and folded on the outer surface of the first cylindrical shape so that the inner surface of the second unit steel pipe surrounds the first seam. In this case, the second seam 121 is positioned not to correspond to the first seam 111. For example, the second seam 121 may be positioned at a location opposite to a location where the first seam 111 is positioned.

Since the unit steel pipe 130 is configured so that a plurality of pipes of the first cylindrical pipe 110 and the second cylindrical pipe 120 are folded on each other, the strength of the unit steel pipe 130 may be improved and as described above, since the first seam 111 and the second seam 121 are positioned not to correspond to each other and the inner surface of the second cylindrical pipe 120 surround both the first seam 111 and the first cylindrical pipe 110, even though pressure in the unit steel pipe 130 increases, the first seam 111 may not be easily damaged.

Meanwhile, a stepped part 112 is formed on one side of the first cylindrical pipe 110. The stepped part 112 is stepped from the outer surface of the first cylindrical pipe 110 to be vertical to the outer surface of the first cylindrical pipe 110 and is formed to have a larger diameter than the outer surface of the first cylindrical pipe 110.

The stepped part 112 as a component for connecting the unit steel pipes 130 when a plurality of unit steel pipes 130 are connected to each other and the plurality of unit steel pipes 130 may be connected to each other by inserting the outer surface of the first cylindrical pipe 110 of the neighboring unit steel pipe 130 into the stepped part 112 formed in any one unit steel pipe 130 when the plurality of unit steel pipes 130 are connected to each other.

Meanwhile, the second cylindrical pipe 120 includes multiple hollows 122. The hollows 122 are arranged at a predetermined interval in the circumferential direction of the second cylindrical pipe 120 and protrude vertically to the circumferential direction. In the case of the hollow 122, for example, a cross-section of the hollow 122 may have a rectangular shape. When the plurality of unit steel pipes 130 are connected to each other by the stepped part 112 as described above, the second cylindrical pipe 120 is preferably folded on the outer surface of the first cylindrical pipe 110 so as to have a length smaller than the length of the first cylindrical pipe 110 so that the outer surface of the first cylindrical pipe 110 is inserted into the stepped part 112.

In FIG. 2, an enlarged diagram of a part where the plurality of corrugated steel pipes 100 are connected to each other is illustrated. Referring to the enlarged diagram, for example, the length (a) of each second cylindrical pipe 120 abutting the stepped part 112 may be 10 cm and the length (b) of the stepped part 112 may be 20 cm. Accordingly, the sum (a+b+a) may be 40 cm. Further, the width (c) of the hollow 122 may be 30 cm and an interval (e) between neighboring hollows 122 may be 40 cm. Accordingly, the lengths of the part where the plurality of corrugated steel pipes 100 are connected to each other and the interval between the hollows may be the same as each other. When the corrugated steel pipe 100 is configured as above, since the lengths of the connection parts of the unit steel pipes 130 and the interval between the hollows are the same as each other, a standard of the corrugated steel pipe 100 may be accurate and since the corrugated steel pipe 100 may be cut even at any point of the corrugated steel pipe 100, the corrugated steel pipe 100 may be simply cut on the spot when the corrugated steel pipe 100 is cut, and as a result, an installation time of the corrugated steel pipe 100 on the spot may be shortened.

The pressure which increases in the corrugated steel pipe 100 is transferred to the inner surface of the second cylindrical pipe 120 and the hollows 122 to be absorbed and offset. That is, expansion force of the corrugated steel pipe 100 transferred to the inner surface of the second cylindrical pipe 120 and the hollows 122 may be distributed into extension force to extend the inner surface of the second cylindrical pipe 120, compression force to compress two sides 122b of the hollow 122, and extension force to extend a top 122a of the hollow 122a. Therefore, since the pressure which increases in the corrugated steel pipe 100 is evenly distributed to be absorbed and offset in the inner surface of the second cylindrical pipe 120 and the hollows 122, rupture of the corrugated steel pipe 100 may be prevented. Accordingly, resistance force to the pressure in the corrugated steel pipe 100 may be improved and the strength may be further improved.

Figure 4:
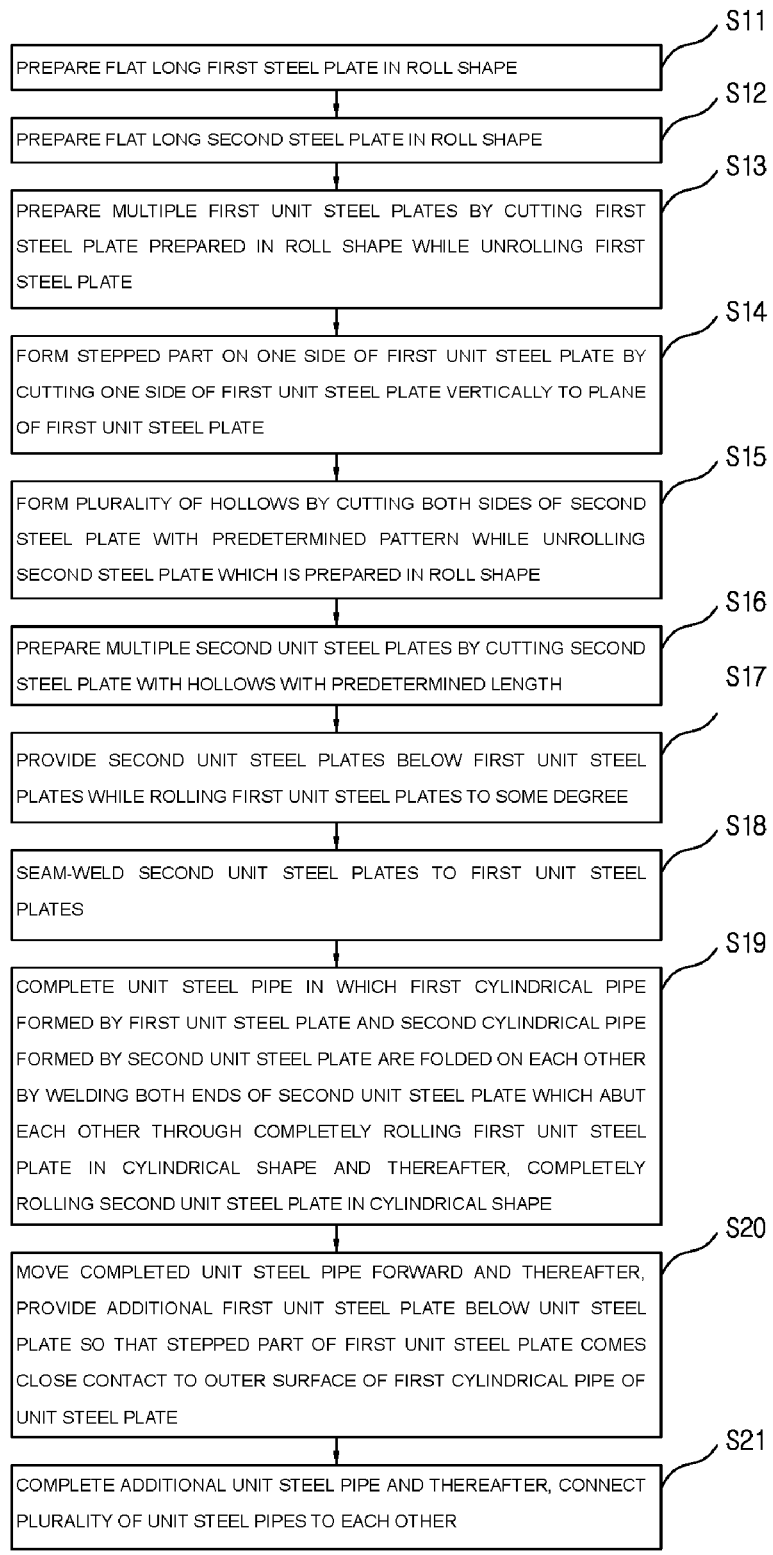
FIG. 4 is a flowchart illustrating a manufacturing process of the corrugated steel pipe according to the first exemplary embodiment of the present invention.
Figure 5:
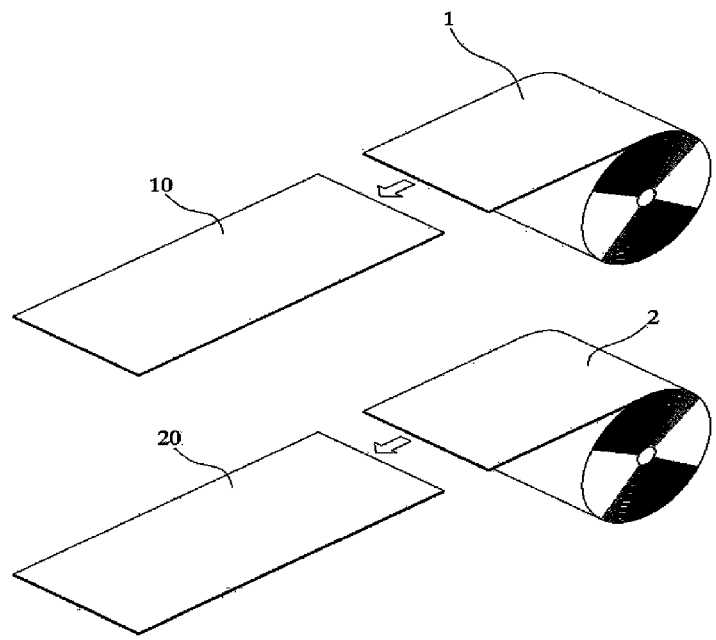
FIGS. 5 to 8 are diagrams illustrating the manufacturing process of the corrugated steel pipe according to the first exemplary embodiment of the present invention.
Figure 6:
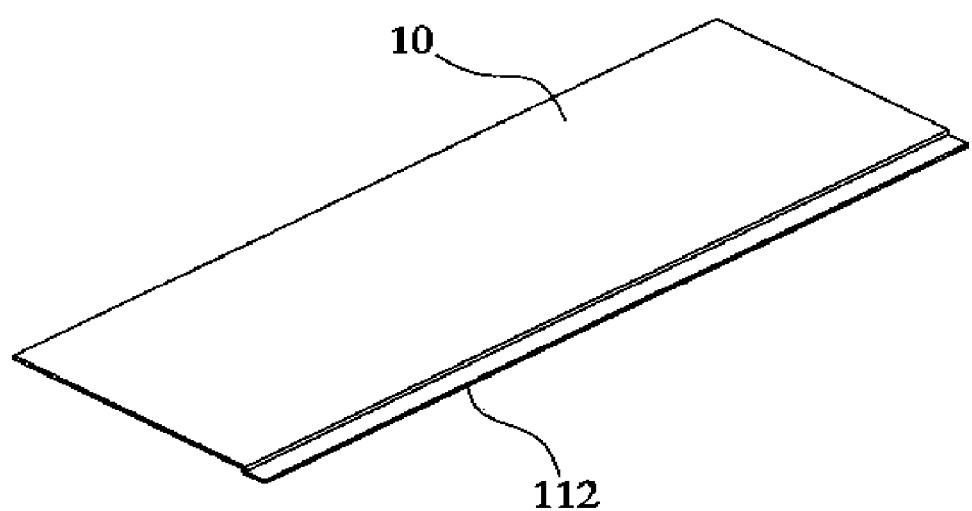

FIG. 4 is a flowchart illustrating a manufacturing process of the corrugated steel pipe according to the first exemplary embodiment of the present invention. FIGS. 5 to 8 are diagrams illustrating the manufacturing process of the corrugated steel pipe according to the first exemplary embodiment of the present invention.

The corrugated steel plate 100 according to the first exemplary embodiment of the present invention is manufactured as follows and hereinafter, the corrugated steel plate 100 will be described with reference to FIGS. 4 to 8.

First, preparing a flat long first steel plate 1 in a roll shape (S11) is performed and further, preparing a flat long second steel plate 2 in the roll shape (S12) is performed. This is clearly illustrated in FIG. 5.

When the first steel plate 1 and the second steel plate 2 are prepared in the roll shape, preparing multiple first unit steel plates 10 by cutting the first steel plate 1 which is prepared in the roll shape with a predetermined length while unrolling the first steel plate 1 (S13) is performed. Further, forming the stepped part 112 on one side of the first unit steel plate 10 by cutting one side of the first unit steel plate 100 on a plane of the first unit steel plate 10 in a vertical direction (S14) is performed. Steps S13 and S14 are described with reference to FIGS. 5 and 6.

Figure 7:
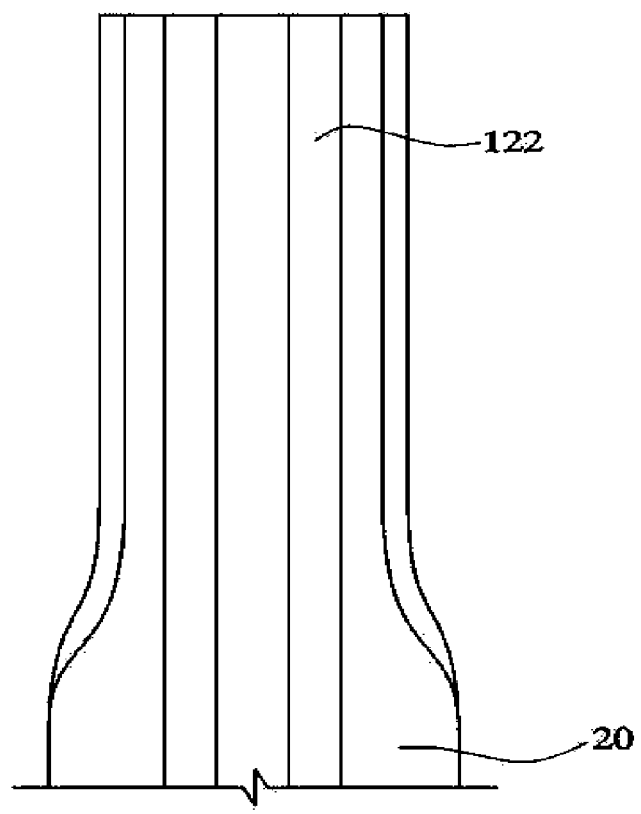
Figure 8:
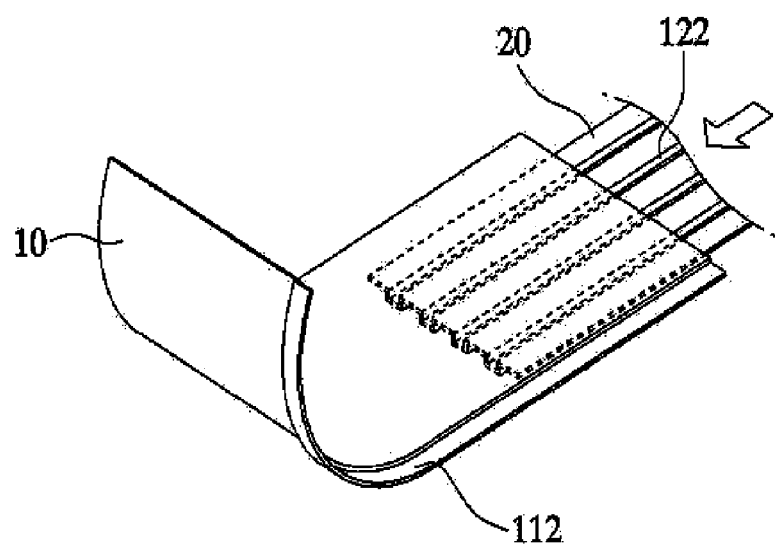

Next, forming the plurality of hollows 122 by cutting both sides of the second steel plate 2 with a predetermined pattern as illustrated in FIG. 7 while unrolling the second steel plate 2 which is prepared in the roll shape (S15) is performed. Further, preparing the multiple second unit steel plates 20 by cutting the second steel plate 2 with the hollows 122 with a predetermined length (S16) is performed.

Providing the second unit steel plates 20 below the first unit steel plates 10 while rolling the first unit steel plates 10 in the cylindrical shape to some degree when the first unit steel plates 10 and the second unit steel plates 20 are prepared (S17) is performed. In this case, the second unit steel plates 20 may be provided below the first unit steel plates 10, for example, at the time when the first unit stele plates 10 are rolled at approximately 180°. This is clearly illustrated in FIG. 8.

After the second unit steel plates 20 are provided, seam-welding the second unit steel plates 20 to the first unit steel plates 10 (S18) is performed. In this case, the seam-welding is performed on surfaces among the hollows 122 of the second unit steel plates 20. Therefore, the second unit steel plates 20 are fixed to the first unit steel plates 10.

Next, completing the unit steel pipe 130 in which the first cylindrical pipe 110 formed by the first unit steel plate 10 and the second cylindrical pipe 120 formed by the second unit steel plate 20 are folded on each other by welding both ends of the second unit steel plate 20 which abut each other through completely rolling the first unit steel plate 10 in the cylindrical shape and thereafter, completely rolling the second unit steel plate 20 in the cylindrical shape (S19) is performed. In this case, the first seam 111 where both axial ends of the first unit steel plate 10 abut each other and the second seam 121 where both axial ends of the second unit steel plate 20 abut each other may be disposed to cross each other without corresponding to each other.

When the unit steel pipe 130 is completed as above, moving the completed unit steel pipe 130 forward and thereafter, providing an additional first unit steel plate 10 below the unit steel plate 130 so that the stepped part 112 of the first unit steel plate 10 comes close contact to the outer surface of the first cylindrical pipe 110 of the unit steel plate 130 (S20) is performed. In this case, the outer surface of the first cylindrical pipe 110 of the completed unit steel pipe 130 and the stepped part 112 of the first unit steel plate 10 abut each other.

Last, an additional unit steel pipe 130 is completed through steps S11 to S19 and thereafter, connecting the plurality of unit steel pipes 130 to each other by repeating steps S11 to S20 (S21) is performed.

According to the manufacturing method of the corrugated steel pipe 100 according to the first exemplary embodiment of the present invention, during manufacturing the corrugated steel pipe 100, since the plurality of unit steel pipes 130 may be connected to each other while completing the additional unit steel pipes 130 subsequently to completing the unit steel pipe 130 at the first stage, the corrugated steel pipe 100 may be rapidly completed.

Further, since the first unit steel plate 10 and the second unit steel plate 20 are fixed to each other through seam welding and the second unit steel plate 20 is rolled in the cylindrical shape subsequently to rolling the first unit steel plate 10 in the roll shape, completing the first cylindrical pipe 110 and completing the second cylindrical pipe 120 may be rapidly performed so that the second cylindrical pipe 120 is folded on the first cylindrical pipe 110.

Accordingly, since the strength of the corrugated steel pipe 100 according to the first embodiment of the present invention increases and a separate waveform corrugation is not formed in the first cylindrical pipe 110, a fluid smoothly flows and the corrugated steel pipe 100 is not easily ruptured in the pressure which increases in the corrugated steel pipe 100, and the corrugated steel pipe 100 is rapidly manufactured, and as a result, a manufacturing period and manufacturing cost may be reduced.

Second Exemplary Embodiment

Figure 9:
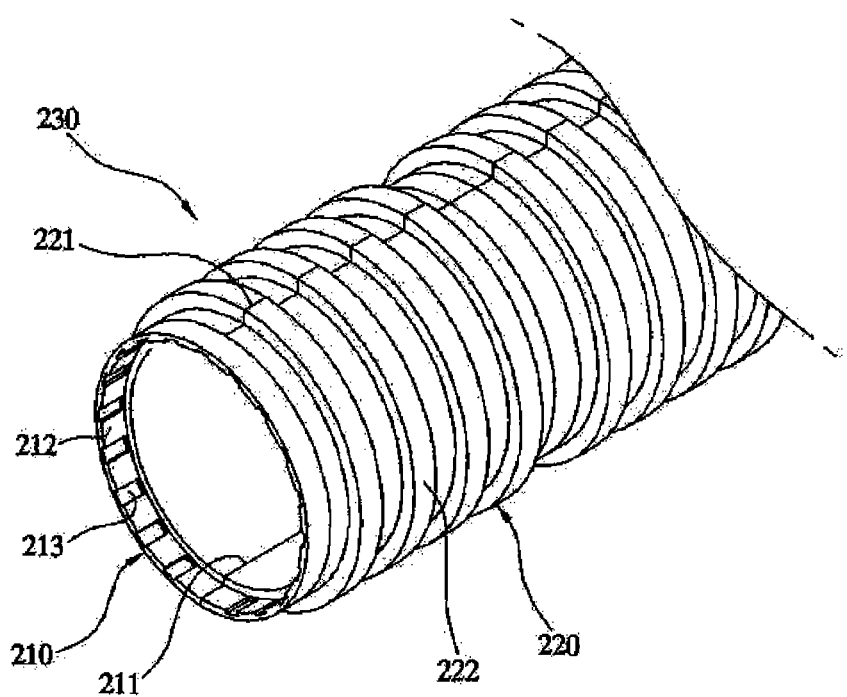
FIG. 9 is a perspective view for describing a corrugated steel pipe according to a second exemplary embodiment of the present invention.
Figure 10:
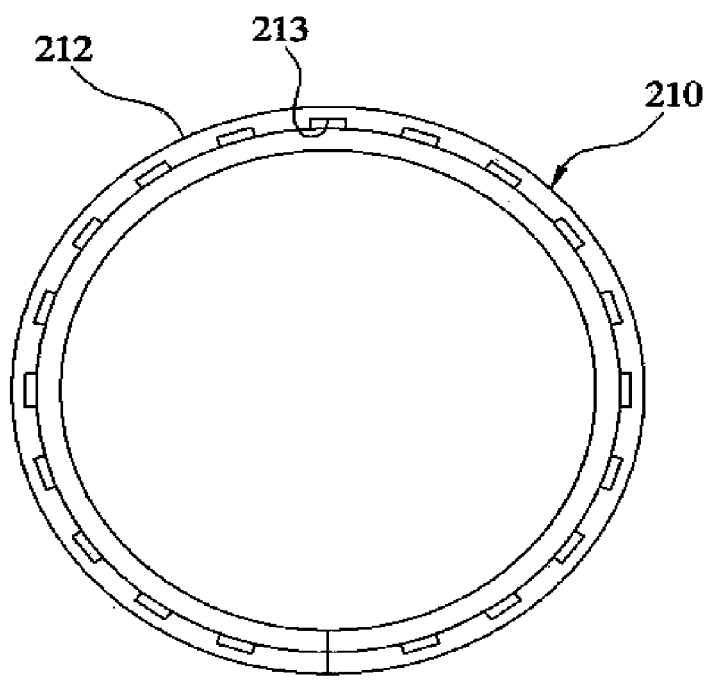
FIG. 10 illustrates an array pattern of grooves formed in unit steel pipes illustrated in FIG. 9.

FIG. 9 is a perspective view for describing a corrugated steel pipe according to a second exemplary embodiment of the present invention. FIG. 10 illustrates an array pattern of grooves formed in unit steel pipes illustrated in FIG. 9.

Referring to FIGS. 9 and 10, since the corrugated steel pipe 200 according to the second exemplary embodiment of the present invention is substantially the same as the corrugated steel pipe 100 according to the first exemplary embodiment of the present invention illustrated in FIG. 1 except a plurality of grooves 213 is formed on the inner surface of the stepped part 212, a detailed description of residual components other than the grooves 213 is omitted and hereinafter, the corrugated steel plate 200 will be described based on the groove S213.

The plurality of grooves 213 formed at the stepped part 212 are components for effectively fixing the unit steel pipes 230 that are connected to each other. The plurality of grooves 213 are arranged at a predetermined interval in the circumferential direction of the stepped part 212. In addition, the plurality of grooves 213 extend in the axial direction of the second cylindrical pipe 220. This is clearly illustrated in FIG. 9.

As the adhesive filler is cured after being filled in the grooves 213, the adhesive filler adheres to the stepped part 212 and the outer surface of the first cylindrical pipe 210 inserted into the stepped part 212 to fix the unit steel pipes 230 that are connected to each other. The adhesive filler is not particularly limited and as one example, the adhesive filler may be a PE based adhesive resin.

Figure 11:
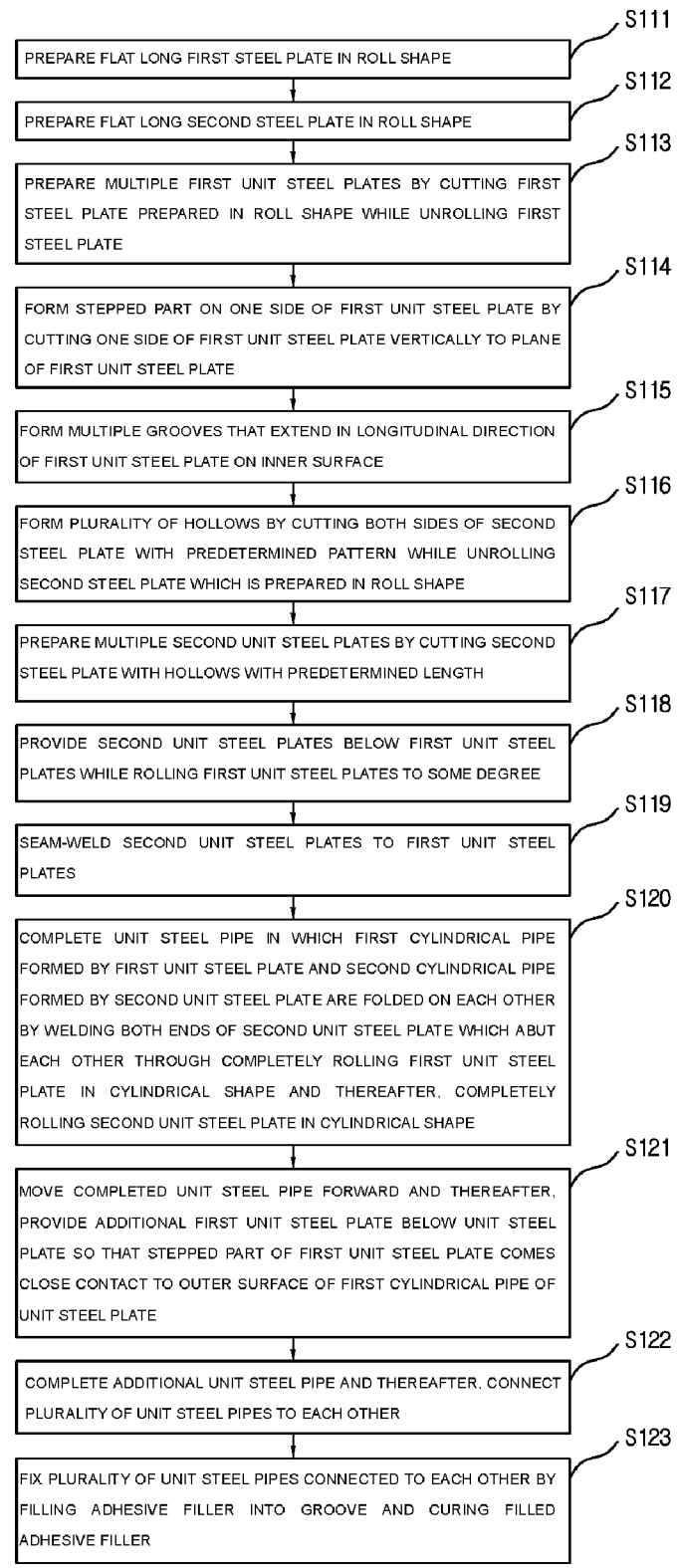
FIG. 11 is a flowchart illustrating a manufacturing process of the corrugated steel pipe according to the second exemplary embodiment of the present invention.
Figure 12:
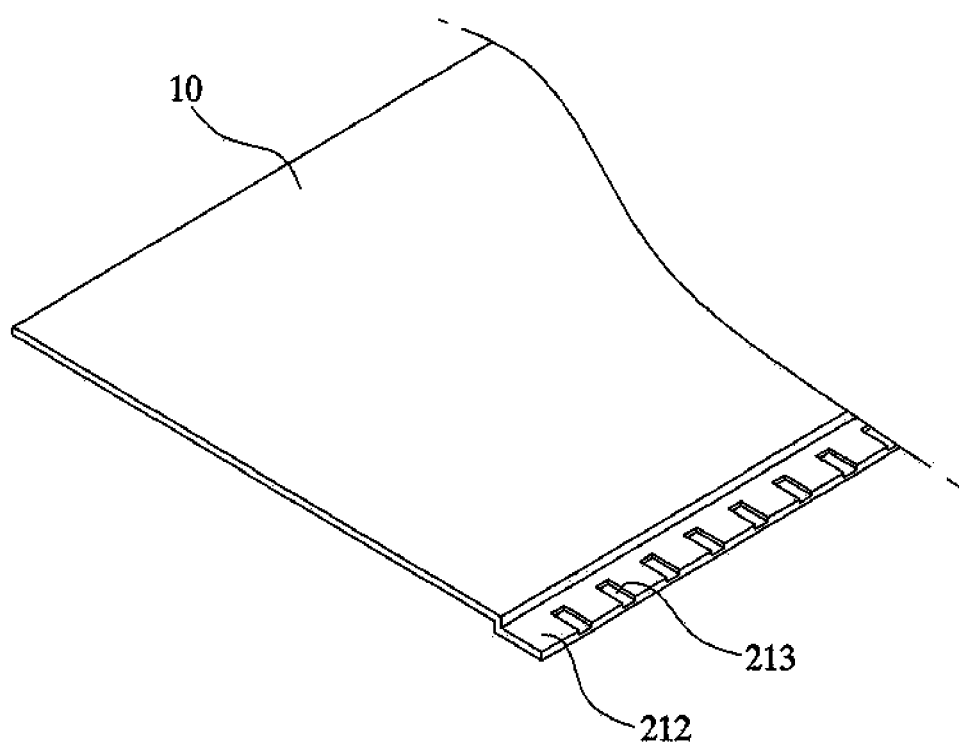
FIG. 12 is a perspective view illustrating a state in which a groove is formed on a first unit steel pipe illustrated in FIG. 6.

FIG. 11 is a flowchart illustrating a manufacturing process of the corrugated steel pipe according to the second exemplary embodiment of the present invention. FIG. 12 is a perspective view illustrating a state in which a groove is formed on a first unit steel pipe illustrated in FIG. 6.

The corrugated steel pipe 200 according to the second exemplary embodiment of the present invention is manufactured as follows. FIG. 11 is a perspective view illustrating a state in which the groove is formed on the first unit steel plate illustrated in FIG. 6. The manufacturing method of the corrugated steel pipe according to the second exemplary embodiment of the present invention will be described below with reference to FIGS. 11 and 12.

First, preparing for a flat long first steel plate 1 in a roll shape (S111) is performed and further, preparing for a flat long second steel plate 2 in the roll shape (S112) is performed.

When the first steel plate 1 and the second steel plate 2 are prepared in the roll shape, preparing multiple first unit steel plates 10 by cutting the first steel plate 1 which is prepared in the roll shape with a predetermined length while unrolling the first steel plate 1 (S113) is performed. Further, forming the stepped part 212 on one side of the first unit steel plate 10 by cutting one side of the first unit steel plate 100 on a plane of the first unit steel plate 10 in a vertical direction (S114) is performed.

Forming the multiple grooves 213 that extend in the longitudinal direction of the first unit steel plate 10 on the inner surface of the stepped part 212 when the stepped part 212 is formed (S115) is performed. This is clearly illustrated in FIG. 12.

Next, forming a plurality of hollows 222 by cutting both sides of the second steel plate 2 with a predetermined pattern while unrolling the second steel plate 2 which is prepared in the roll shape (S116) is performed. Further, preparing the multiple second unit steel plates 20 by cutting the second steel plate 2 with the hollows 222 with a predetermined length (S117) is performed.

Providing the second unit steel plates 20 below the first unit steel plates 10 while rolling the first unit steel plates 10 in the cylindrical shape to some degree when the first unit steel plates 10 and the second unit steel plates 20 are prepared (S118) is performed. In this case, the second unit steel plates 20 may be provided below the first unit steel plates 10, for example, at the time when the first unit stele plates 10 are rolled at approximately 180°.

After the second unit steel plates 20 are provided, seam-welding the second unit steel plates 20 to the first unit steel plates 10 (S119) is performed. In this case, the seam-welding is performed on surfaces among the hollows 222 of the second unit steel plates 20. Therefore, the second unit steel plates 20 are fixed to the first unit steel plates 10.

Next, completing the unit steel pipe 230 in which the first cylindrical pipe 210 formed by the first unit steel plate 10 and the second cylindrical pipe 220 formed by the second unit steel plate 20 are folded on each other by welding both ends of the second unit steel plate 20 which abut each other through completely rolling the first unit steel plate 10 in the cylindrical shape and thereafter, completely rolling the second unit steel plate 20 in the cylindrical shape (S120) is performed. In this case, the first seam 211 where both axial ends of the first unit steel plate 10 abut each other and the second seam 221 where both axial ends of the second unit steel plate 20 abut each other may be disposed to cross each other without corresponding to each other.

When the unit steel pipe 230 is completed as above, moving the completed unit steel pipe 230 forward and thereafter, providing an additional first unit steel plate 10 below the unit steel plate 230 so that the stepped part 212 of the first unit steel plate 10 comes close contact to the outer surface of the first cylindrical pipe 210 of the unit steel plate 230 (S121) is performed. In this case, the outer surface of the first cylindrical pipe 210 of the completed unit steel pipe 230 and the stepped part 212 of the first unit steel plate 10 abut each other.

Last, an additional unit steel pipe 230 is completed through steps S111 to S120 and thereafter, connecting the plurality of unit steel pipes 230 to each other by repeating steps S111 to S121 (S122) is performed.

Fixing the plurality of unit steel pipes 230 that are connected to each other by filling and curing the adhesive filler (not illustrated) into the grooves 213 formed at the stepped part 212 when the plurality of unit steel pipes 230 are connected to each other (S123) is performed.

Since in the corrugated steel pipe 200 according to the second exemplary embodiment of the present invention, the plurality of grooves 213 are formed at the stepped part 212 and the unit steel pipes 230 connected to each other are fixed by filling the adhesive filler into the grooves 213 and curing the filled adhesive filler, the unit steel pipes 230 may be simply fixed without a welding operation for fixing the unit steel pipes 230 connected to each other.

Meanwhile, as the circumference of the inner periphery of the unit steel pipe 130/230 is coated with a fragrance material having sterilization and disinfection functions, a clean state is maintained by sterilization and insecticidal actions.

Functional oil may be mixed with the fragrance material and as a mixing ratio thereof, the functional oil of 3 to 5 w % is mixed with the fragrance material of 95 to 97 w % and the functional oil is composed of Alisma canaliculatum of 50 w % and Fennel of 50 w %.

Herein, the functional oil of 3 to 5 w % is preferably mixed with the fragrance material. When the mixing ratio of the functional oil is less than 3 w %, an effect thereof is slight and when the mixing ratio of the functional oil is more than 3 to 5 w %, a function thereof is not significantly improved, while the manufacturing cost significantly increases.

Alisma canaliculatum in the function oil belongs to Alismataceae and a bacteria toxic effect is high and an antibacterial activity is excellent.

Fennel as a plant that belongs to the same group as aniseed, caraway, coriander, and the like may include anethol, estragol, camphene, and the like as chemical components and is excellent in antibacterial and sterilization effects.

As the inner periphery of the unit steel pipe 130/230 is coated with the functional oil, the functional oil serves to perform the sterilization and disinfection functions to cleanly maintain the inside of the unit steel pipe 130/230 and purify the fluid that flows in the unit steel pipe 130/230.

What is claimed is:

1. A method for manufacturing a corrugated steel pipe, the method comprising:
   a) preparing a flat long first steel plate in a roll shape;
   b) preparing a flat long second steel plate in the roll shape;
   c) preparing multiple first unit steel plates by cutting the first steel plate prepared in the roll shape while unrolling the first steel plate;
   d) forming a stepped part on one side of the first unit steel plate by cutting one side of the first unit steel plate vertically to a plane of the first unit steel plate;
   e) forming a plurality of hollows by cutting both sides of the second steel plate with a predetermined pattern while unrolling the second steel plate which is prepared in the roll shape;
   f) preparing the multiple second unit steel plates by cutting the second steel plate with the hollows with a predetermined length;
   g) providing the second unit steel plates below the first unit steel plates and seam-welding the second unit steel plates to the first unit steel plates;
   h) rolling the first unit steel plates and the second unit steel plates;
   i) completing a unit steel pipe in which a first cylindrical pipe formed by the first unit steel plate and a second cylindrical pipe formed by the second unit steel plate are folded on each other by welding both ends of the second unit steel plate which abut each other through completely rolling the first unit steel plate in the cylindrical shape and thereafter, completely rolling the second unit steel plate in the cylindrical shape;
   j) moving the completed unit steel pipe forward and thereafter, providing an additional first unit steel plate below the unit steel plate so that the stepped part of the first unit steel plate contacts an outer surface of the first cylindrical pipe of the unit steel plate; and
   k) completing the additional unit steel pipe through steps a) to i) and thereafter, connecting the plurality of unit steel pipes to each other by repeating steps a) to j).

2. A method for manufacturing a corrugated steel pipe, the method comprising:
   a) preparing a flat long first steel plate in a roll shape;
   b) preparing a flat long second steel plate in the roll shape;
   c) preparing multiple first unit steel plates by cutting the first steel plate prepared in the roll shape while unrolling the first steel plate;
   d) forming a stepped part on one side of the first unit steel plate by cutting one side of the first unit steel plate vertically to a plane of the first unit steel plate;
   e) forming multiple grooves that extend in the longitudinal direction of the first unit steel plate on the inner surface;
   f) forming a plurality of hollows by cutting both sides of the second steel plate with a predetermined pattern while unrolling the second steel plate which is prepared in the roll shape;
   g) preparing the multiple second unit steel plates by cutting the second steel plate with the hollows with a predetermined length;
   h) providing the second unit steel plates below the first unit steel plates and seam-welding the second unit steel plates to the first unit steel plates;
   i) rolling the first unit steel plates and the second unit steel plates;
   j) completing a unit steel pipe in which a first cylindrical pipe formed by the first unit steel plate and a second cylindrical pipe formed by the second unit steel plate are folded on each other by welding both ends of the second unit steel plate which abut each other through completely rolling the first unit steel plate in the cylindrical shape and thereafter, completely rolling the second unit steel plate in the cylindrical shape;
   k) moving the completed unit steel pipe forward and thereafter, providing an additional first unit steel plate below the unit steel plate so that the stepped part of the first unit steel plate contacts an outer surface of the first cylindrical pipe of the unit steel plate;
   l) completing the additional unit steel pipe through steps a) to i) and thereafter, connecting the plurality of unit steel pipes to each other by repeating steps a) to k); and
   m) fixing the plurality of unit steel pipes connected to each other by filling an adhesive filler into the groove and curing the filled adhesive filler.

* * * * *